United States Patent
Schell et al.

(10) Patent No.: US 7,477,476 B2
(45) Date of Patent: Jan. 13, 2009

(54) TRAJECTORY CONTROL PROFILE WITH NON-ZERO INITIAL VELOCITY

(75) Inventors: David Louis Schell, Fort Collins, CO (US); Lingzhi Yang, Firestone, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/760,425

(22) Filed: Jun. 8, 2007

(65) Prior Publication Data

US 2007/0285833 A1     Dec. 13, 2007

Related U.S. Application Data

(60) Provisional application No. 60/813,289, filed on Jun. 13, 2006.

(51) Int. Cl.
*G11B 5/596* (2006.01)
(52) U.S. Cl. .................................... 360/78.06

(58) Field of Classification Search ............... None
See application file for complete search history.

(56) References Cited

U.S. PATENT DOCUMENTS

| | | | |
|---|---|---|---|
| 5,179,514 A * | 1/1993 | Rastegar et al. | 700/63 |
| 6,031,684 A | 2/2000 | Gregg | |
| 6,111,720 A | 8/2000 | Clare et al. | |
| 6,178,060 B1 * | 1/2001 | Liu | 360/78.07 |
| 6,549,364 B1 | 4/2003 | Shih | |
| 6,574,070 B2 | 6/2003 | Gregg | |
| 6,744,590 B2 * | 6/2004 | Chu et al. | 360/78.06 |
| 6,801,384 B2 | 10/2004 | Chu et al. | |
| 6,870,342 B2 | 3/2005 | Naik | |
| 6,873,490 B2 * | 3/2005 | Guo et al. | 360/78.07 |
| 7,054,099 B2 * | 5/2006 | Hansen | 360/78.06 |
| 7,136,258 B2 | 11/2006 | Kisaka | |

* cited by examiner

*Primary Examiner*—K. Wong
(74) *Attorney, Agent, or Firm*—Fellers, Snider, et al.

(57) ABSTRACT

Various embodiments are generally directed to moving a control object using a sine-based trajectory profile with an initial non-zero velocity.

20 Claims, 4 Drawing Sheets

TRAJECTORY CONTROL PROFILE WITH NON-ZERO INITIAL VELOCITY

RELATED APPLICATIONS

The present application makes a claim of domestic priority to U.S. Provisional Patent Application No. 60/813,289 filed Jun. 13, 2006.

BACKGROUND

Trajectory control profiles are often used by a control system to position a control object. Such profiles generally define a desired seek trajectory for the control object as the object is moved from an initial position to a destination position.

If the control object has a substantial non-zero initial velocity at the beginning of the seek, however, the control system may not be able to adequately follow the associated profile(s). This may result in overall loss of control, excessive settle time, and/or the undesired excitation of system resonances.

SUMMARY

Various embodiments are generally directed to moving a control object using a sine-based trajectory profile with an initial non-zero velocity.

In accordance with some embodiments, a method generally comprises formulating a sine-based trajectory profile in relation to an initial non-zero velocity of a control object, and moving the control object to nominally follow the profile from an initial position to a destination position.

In accordance with other embodiments, an apparatus generally comprises a control object, and a controller which formulates a sine-based trajectory profile in relation to an initial non-zero velocity of the control object, and moves the control object to nominally follow the profile from an initial position to a destination position.

In accordance with still other embodiments, an apparatus generally comprises a control object, and first means for formulating a sine-based trajectory profile in relation to an initial non-zero velocity of the control object, and for moving the control object from an initial position to a destination position in relation to the profile and the initial non-zero velocity.

DETAILED DESCRIPTION

Figure 1:
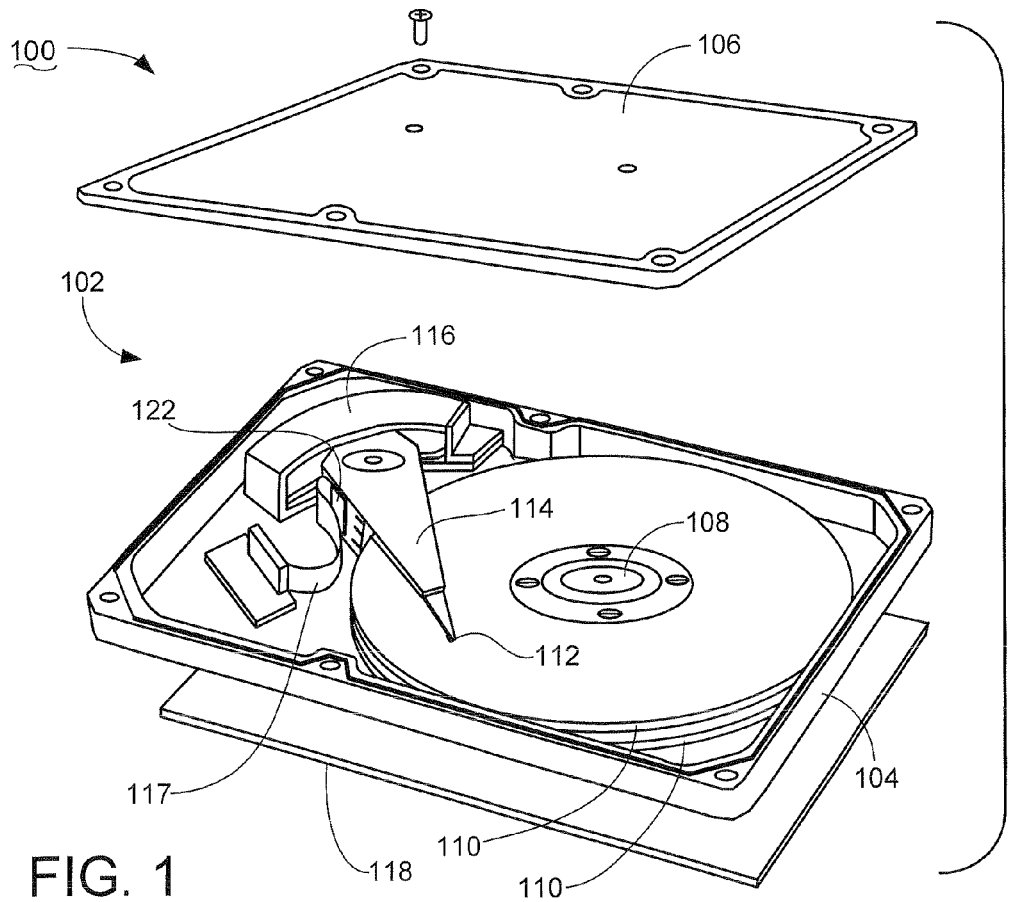
FIG. 1 is an exploded isometric view of an exemplary data storage device.

FIG. 1 provides a top plan view of a data storage device 100. The device 100 is provided to show an exemplary environment in which embodiments of the present invention can be advantageously practiced. It will be understood, however, that the claimed invention is not so limited.

The device 100 includes a housing 102 formed from a base deck 104 and top cover 106. An internally disposed spindle motor 108 is configured to rotate a number of storage media 110. An array of transducers 112 access data tracks (not shown) defined on the media surfaces to transfer data between the media 110 and a host device.

An actuator 114 moves the transducers 112 through application of current to a voice coil motor (VCM) 116. A flex circuit assembly 117 provides electrical communication paths between the actuator 112 and device control electronics on an externally disposed printed circuit board (PCB) 118.

Figure 2:
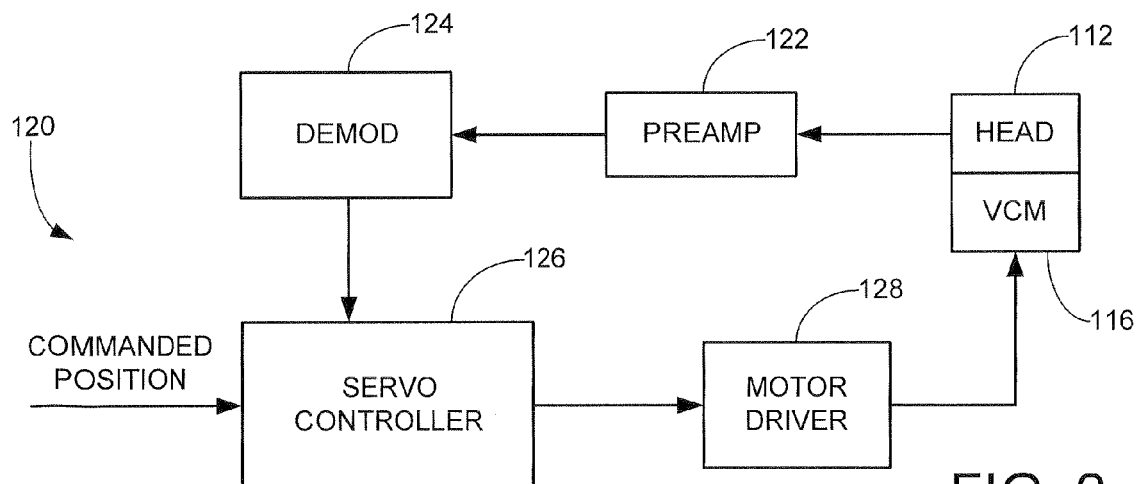
FIG. 2 provides a functional representation of a closed loop servo control circuit of the device of FIG. 1.

FIG. 2 provides a generalized functional block diagram for a closed loop servo control circuit 120 of the device 100. Embedded servo data are transduced from the media 110 by a selected transducer 112 and provided to a preamplifier/driver (preamp) circuit 122. The preamp circuit 122 preamplifies and filters the readback signals from the transducer 112, and provides the processed servo data to a demodulation (demod) circuit 124.

The demod circuit 124 detects and conditions the servo data, including application of automatic gain control (AGC) and conversion of the signals to digital form. A servo controller 126 processes the digitized servo data to generate a current command signal that is supplied to a motor driver circuit 128. In response, the driver circuit 128 applies the appropriate current to the VCM 116 to position the transducer 112.

The servo controller 126 is preferably characterized as a programmable processor with associated servo code to direct the operation of the servo loop, although the controller can take other forms including being partially or fully realized in hardware. The controller 126 generally operates in two primary modes, seeking and track following. Seeking generally involves controlled movement of the selected transducer 112 from an initial track to a destination track. Track following generally comprises operation of the controller 126 to maintain the selected transducer 112 over the center (or other commanded position) a selected track in order to carry out data I/O operations with the track.

As explained below, during a seek operation the servo circuit 120 preferably operates to formulate a seek profile that defines a sinusoidal trajectory for a selected transducer 112 from an initial track at a non-zero velocity to a destination track at a zero velocity. The transducer 112 is then moved to the destination track in relation to the formulated seek profile and a measured non-zero initial velocity of the transducer.

Figure 3:
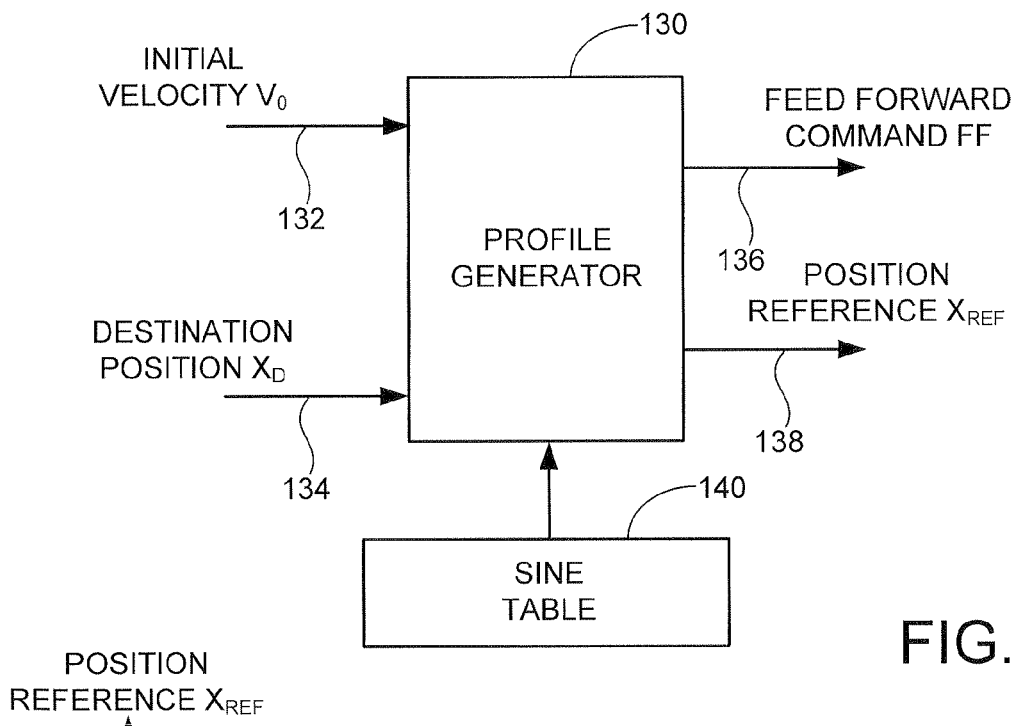
FIG. 3 illustrates a portion of the circuit of FIG. 2.

An embodiment of the servo controller 126 is set forth by FIG. 3. A profile generator 130 receives an initial velocity ($V_O$) value on path 132 generally indicative of the measured velocity of the associated transducer 112 at the commencement of the seek operation.

The profile generator 130 further receives a destination position ($X_D$) value on path 134, which generally identifies the final position (e.g., a destination track) to which the transducer is to be moved. The difference between the destination position and a present position ($X_O$) indicates a seek length value, or physical distance to be moved during the seek.

In response to these inputs, the profile generator 130 outputs a feed forward command (FF) profile on path 136, and a position reference ($X_{REF}$) profile on path 138. The FF profile defines a desired sinusoidal acceleration trajectory for the transducer 112, and the $X_{REF}$ profile defines a desired sinusoidal position displacement during the seek. In some embodiments, sine-function based values are supplied to the profile generator 130 by a separate sine table 140, although sine-function approximations can be alternatively calculated as discussed below.

The FF and $X_{REF}$ profiles are utilized by the servo controller 126 as reference profiles during the seek operation, so that the respective acceleration and positional displacement of the transducer 112 are caused to nominally follow the FF and $X_{REF}$ profiles during the seek operation. It is contemplated that the profiles are utilized for relatively short model reference seeks, although such is not limiting. Other profiles can be generated and used during the seek operation as well, such as a jerk profile, a velocity profile, etc.

The profile generator 130 of FIG. 3 preferably generates the FF and $X_{REF}$ profiles in accordance with the following relationships:

$$FF(n) = \frac{2\pi\left(seeklength - \frac{TV_0}{2}\right)}{T^2}\sin\left(\frac{2\pi n}{T}\right) - \frac{V_0}{T} \quad (1)$$

$$X_{REF}(n) = \left(seeklength - \frac{TV_0}{2}\right)\left(\frac{n}{T} - \frac{\sin\left(\frac{2\pi n}{T}\right)}{2\pi}\right) + \left(1 - \frac{n}{2T}\right)nV_0 \quad (2)$$

where T is the seek period, or interval during which the seek is to be carried out over seek samples n (i.e., n increments from 1 to T), seeklength is the physical distance over which the transducer 112 is to be moved, $V_0$ is the initial velocity, FF(n) is the feed forward command value for each seek sample n from 1 to T, and $X_{REF}(n)$ is the corresponding position value for each seek sample n from 1 to T. While the foregoing formulations are preferred, such are not limiting.

The profiles of equations (1) and (2) accommodate substantial ranges of initial velocity values while still providing smooth, continuous and efficient trajectories to the destination track. The profiles further eliminate the need to separately brake the transducer to bring the velocity to substantially zero prior to the seek, as well as eliminate the need to apply relatively large impulse acceleration values to kill the initial velocity during early stages of the seek.

Figure 4:
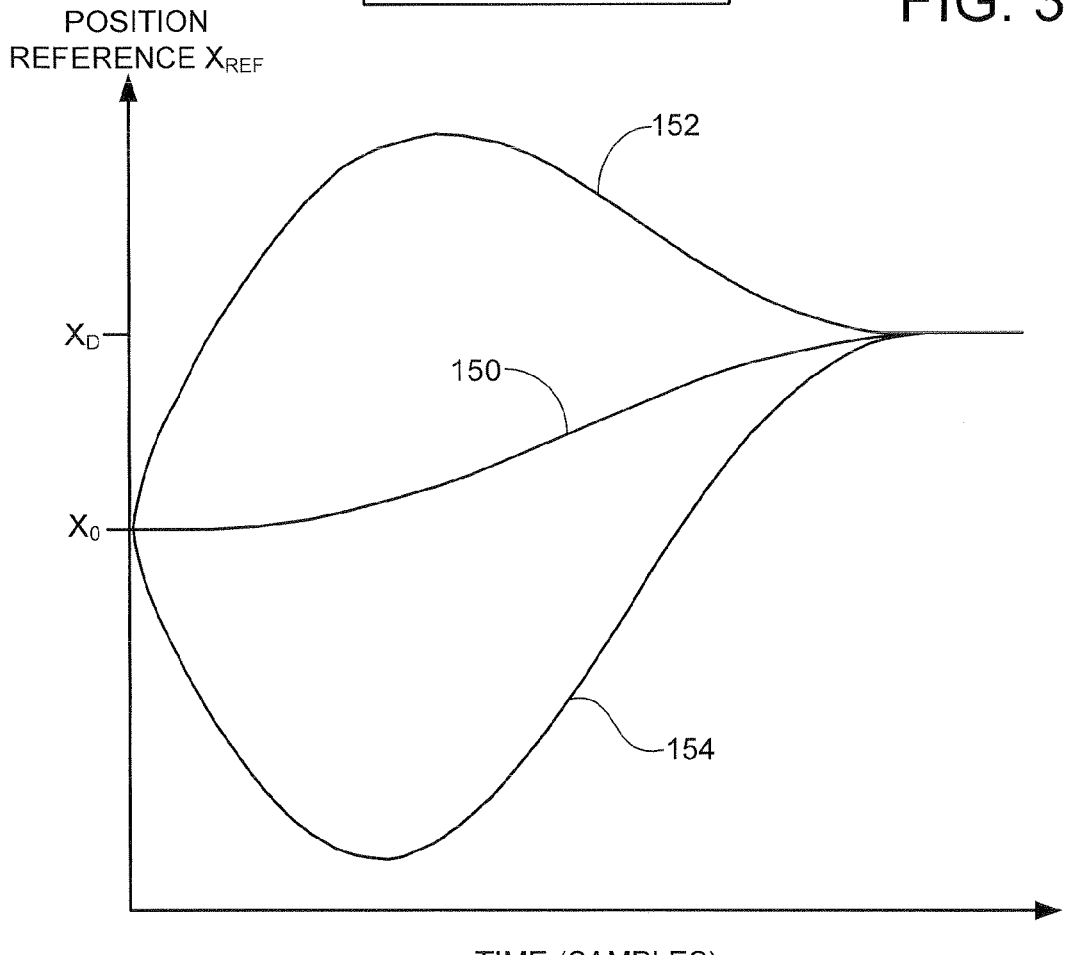
FIG. 4 sets forth exemplary position reference profiles generated by the circuit of FIG. 3.

FIG. 4 shows a number of exemplary position reference $X_{REF}$ profiles generated by the profile generator 130 for a one-track seek in which the selected transducer 112 is moved from a selected track ($X_0$) to the next adjacent track ($X_D$).

Curve 150 in FIG. 4 constitutes a baseline displacement profile for a substantially zero initial velocity (i.e., $V_0=0$). That is, curve 150 represents the radial displacement of the transducer 112 from a stationary position over the initial track to a stationary position over the destination track. The seek takes a total of 20 samples to complete (i.e., T=20), although other numbers of samples could be used. As can be seen from FIG. 4, the associated displacement of curve 150 provides a smooth, well controlled trajectory to the destination track.

A second profile is denoted by curve 152. Curve 152 corresponds to the same one-track seek, but this time the transducer 112 is provided with an initial velocity $V_0$ of 0.5 tracks/sample in a direction toward the destination track, and will also complete the seek in 20 samples (i.e., T=20). As shown in FIG. 4, the second profile causes the transducer 112 to initially overshoot the destination track, and then quickly return to the final position in a smooth and continuous manner.

A third profile is denoted by curve 154, which shows the one-track seek to be carried out with an initial velocity of −0.5 tracks/sample away from the destination track which is also completed in 20 samples (T=20). As shown in FIG. 4, the displacement continues for a short time away from the destination track, but quickly reverses and arrives at the final position in what is also a smooth and continuous manner.

Figure 5:
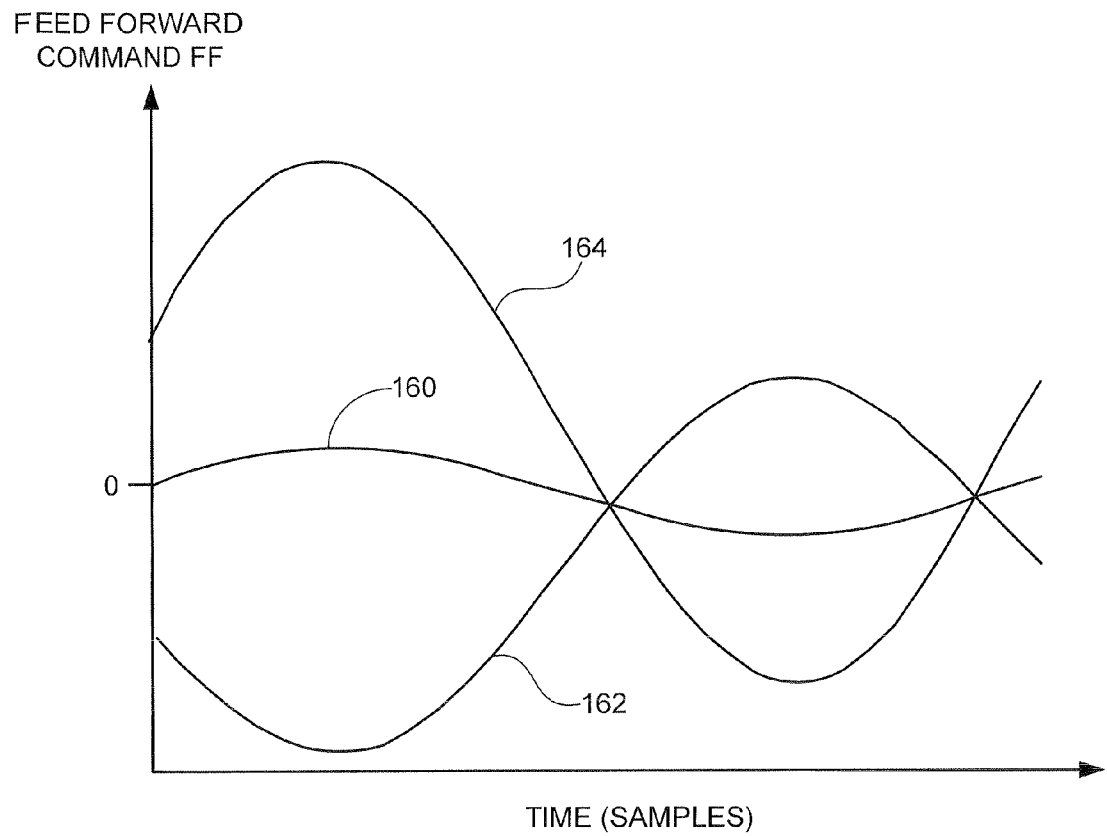
FIG. 5 sets forth exemplary feed forward command profiles generated by the circuit of FIG. 3.

FIG. 5 sets forth a number of corresponding feed forward (FF) commands generated by the profile generator 130 of FIG. 3 in conjunction with the profiles of FIG. 4 to define the corresponding desired acceleration for the transducer 112 from the initial track to the destination track. Baseline FF curve 160 describes the feed forward command necessary to induce the positional displacement of the transducer 112 represented by the baseline displacement curve 150 in FIG. 5. Similarly, FF curve 162 corresponds to the displacement curve 152, and FF curve 164 corresponds to the displacement curve 154.

As can be seen from FIGS. 4 and 5, the respective sinusoidal FF and $X_{REF}$ profiles advantageously reduce the excitation of system resonances and decrease settling time once the transducer reaches the destination track. Preferably, the shapes of the FF and $X_{REF}$ profiles will change independently as a function of seek length (SL), initial velocity ($V_0$) and seek time (T).

Figure 6:
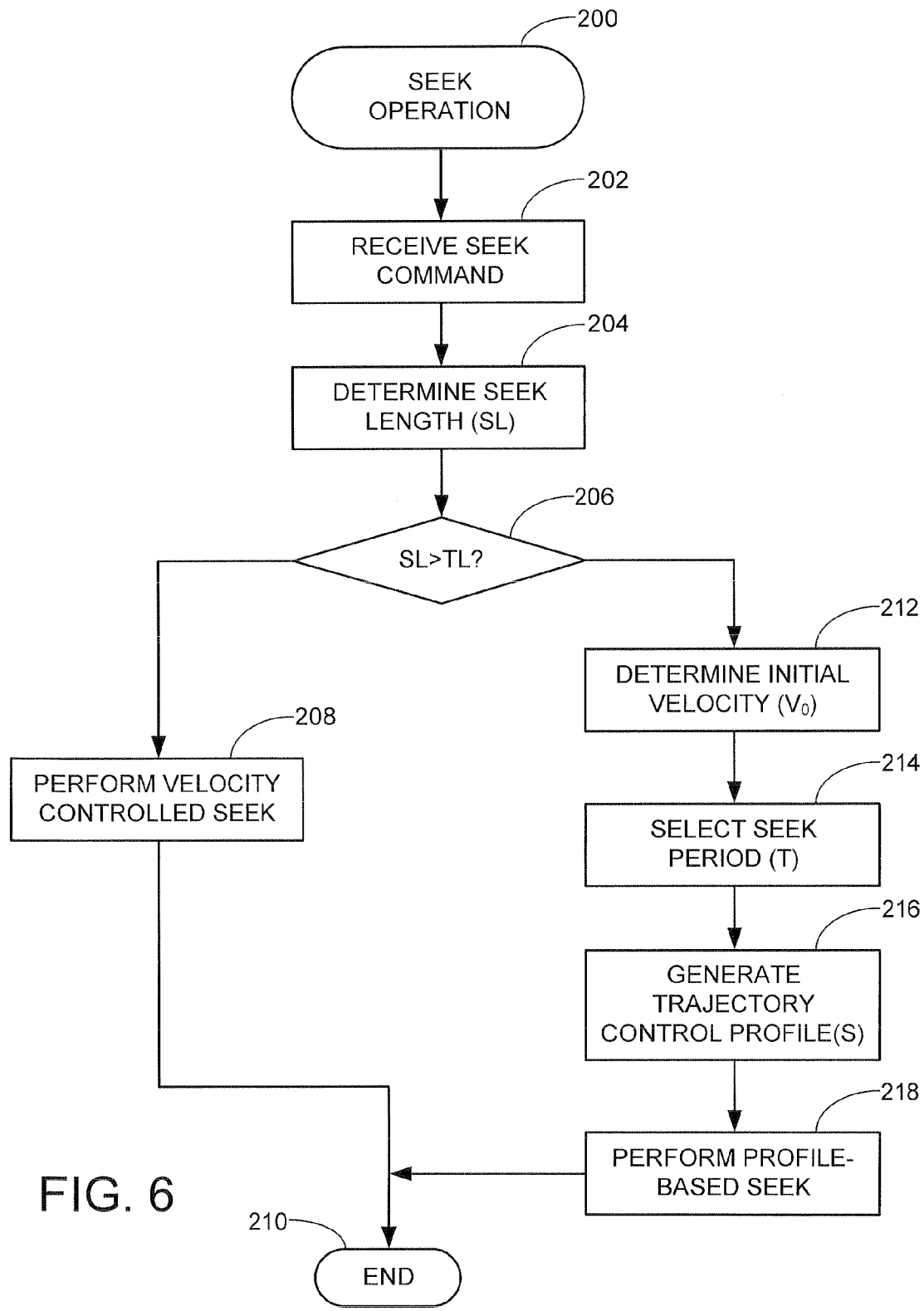
FIG. 6 shows a flow chart for a SEEK OPERATION routine.

FIG. 6 sets forth a SEEK OPERATION routine 200, generally representative of steps carried out in accordance with embodiments of the present invention by the servo circuit 120 of FIG. 2. At step 202, a seek command is received which instructs the servo circuit 120 to move the selected transducer 112 to a particular final position (e.g., destination track). The corresponding seek length (SL) is determined at step 204 in relation to the difference between the final position and the present position of the transducer 112.

Decision step 206 next evaluates the seek length in relation to a threshold length (TL). Relatively longer seeks (SL>TL) are preferably carried out using a conventional velocity controlled approach at step 208 in which the transducer 112 is accelerated to a maximum coast velocity and then controllably decelerated to the destination track along a velocity deceleration profile. The routine then ends at step 210.

Shorter seeks on the other hand preferably utilize the sinusoidal profile methodology discussed above. In such case the routine continues at step 212 to determine the radial velocity $V_0$ of the transducer 112. This can be carried out in a number of ways, including by detecting changes in actual position from the servo data of the initial track currently being followed.

The seek period T is next selected at step 214 to identify an appropriate number of samples n over which the sinusoidal profile-based seek is to be performed. As desired, various ranges of seek lengths can be correlated to different seek periods, such as T=20 samples for seeks of up to $X_1$ tracks in length, T=25 for seeks between $X_1$ and $X_2$ tracks in length, and so on.

Associated trajectory control profiles are next generated at step 216 to define the desired trajectories for the transducer 112, taking into account the seek period T and the initial velocity $V_0$. Preferably, FF and $X_{REF}$ profiles are generated during this step in accordance with equations (1) and (2) above, although such is not limiting. The seek is thereafter performed at step 218 in accordance with the profile(s) generated at step 216 to move the transducer 112 to the destination track, after which the routine ends at step 210 as before.

Figure 7:
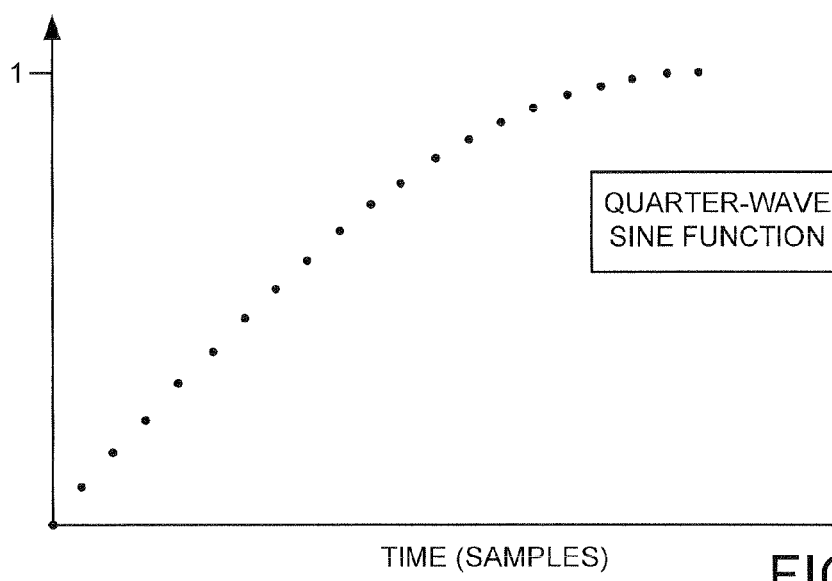
FIG. 7 graphically illustrates values from the sine table shown in FIG. 3.

Generally, profile formulations such as exemplified by equations (1) and (2) are relatively straightforward except for the sine-function values (in this case, $\sin(2\pi n/T)$). The sine-function values can be obtained from the sine table 140 in FIG. 3, for which exemplary quarter-wave values are generally depicted in FIG. 7. When greater resolution is needed such as with longer profile-based seeks, the values in FIG. 7 can be used in conjunction with a first order (linear) interpolation between adjacent values.

In other embodiments, a table-less implementation is provided in which a Taylor series approximation for the sine-function is utilized. As will be recognized, the Taylor series for the sine function is given as:

$$\sin(x) = x - \frac{x^3}{3!} + \frac{x^5}{5!} + \frac{x^7}{7!} + \ldots \quad (3)$$

where x is in radians. In order to reduce computational complexity, only the first few terms are used for the interval 0 to π/4. For angles outside of this range, the computation uses periodicity and symmetry of the sine function to extrapolate. Homer's rule is also used to factor the higher order terms and factorial terms. This reduces the sine function approximation to:

$$\sin(x) = x\left(1 - \frac{x^2\left(1 - \frac{x^2\left(1 - \frac{x^2}{6*7}\right)}{4*5}\right)}{2*3}\right) \quad (4)$$

The formulation of equation (4) is advantageous compared to equation (3) since the highest order calculation is $x^2$ rather than $x^7$, and the factorial terms of equation (3) are eliminated from equation (4). Empirical analysis demonstrates that the values from equation (4) closely align with the respective sine function values of FIG. 7. Other formulations can be used, however as desired, depending on the requirements of a given application.

While embodiments presented herein have been directed to the environment of a data storage device, such is not limiting. Rather, any number of control system environments can be tailored to incorporate the invention as claimed below, including control systems that carry out movements of control objects in other coordinate domains such as rotational, linear, parabolic, spherical, etc. Reference herein to sine-based profiles is not necessarily limited to profile formulations that include the term sin(x), but rather extend to other sinusoidal functions including cos(x), 1−cos(x), arctan(x), etc., as well as polynomial approximations thereof.

The term "track" will be understood broadly to describe a trajectory associated with a control object, irrespective of whether data are, or can be, stored therealong. The first means will be understood to correspond to the circuitry of FIG. 3 with or without a sine table, and excludes a conventional velocity control seek approach based on velocity error terms such as carried out by step 208 of FIG. 6.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising formulating a continuous sine-based trajectory profile in relation to an initial non-zero velocity of a control object, and moving the control object to nominally follow the profile from an initial position to a destination position, wherein the profile displaces the control object both toward and away from the destination position during the moving step.

2. The method of claim 1, wherein the formulating step comprises using a sine table to provide a sin(x) value used in the formulation of the profile.

3. The method of claim 1, wherein the initial non-zero velocity of the control object is in a first direction toward the destination position, and wherein an initial portion of the profile displaces the control object along a sinusoidal path that reaches and then bypasses the destination position while moving in the first direction and a subsequent portion of the profile returns the control object back to the destination position along a second sinusoidal path while moving in a second direction opposite the first direction.

4. The method of claim 1, wherein the initial non-zero velocity of the control object is in a first direction away from the destination position, and wherein an initial portion of the profile displaces the control object along a sinusoidal path that displaces the control object farther from the destination position than the initial position while moving in the first direction and a subsequent portion of the profile returns the control object back to the destination position along a second sinusoidal path while moving in a second direction opposite the first direction.

5. The method of claim 1, wherein the profile results in the control object having a substantially zero velocity at the destination position.

6. The method of claim 1, wherein the formulating step comprises generating a sinusoidal feed forward command profile and generating a sinusoidal position reference profile, and the moving step comprises generating a control signal in relation to both the sinusoidal feed forward command profile and the sinusoidal position reference profile.

7. The method of claim 1, wherein the formulating step comprises using a Taylor series approximation.

8. The method of claim 1, wherein the moving step comprises applying current to a motor to cause the control object to nominally follow the profile over a plurality of samples during a seek interval.

9. The method of claim 1, wherein the control object is characterized as a data transducer adjacent a storage medium.

10. An apparatus comprising a control object, and a controller which formulates a sine-based trajectory profile in relation to an initial non-zero velocity of the control object, and moves the control object to nominally follow the profile from an initial position to a destination position, the profile defining a continuous trajectory with multiple portions, wherein at least one portion displaces the control object toward the destination position, and wherein at least one other portion displaces the control object away from the destination position.

11. The apparatus of claim 10, wherein the controller uses a sine table to provide a sin(x) value used in the formulation of the profile.

12. The apparatus of claim 10, wherein the initial non-zero velocity of the control object is in a first direction toward the destination position, and wherein an initial portion of the profile displaces the control object along a sinusoidal path that reaches and then bypasses the destination position while moving in the first direction and a subsequent portion of the profile returns the control object back to the destination position along a second sinusoidal path while moving in a second direction opposite the first direction.

13. The apparatus of claim 10, wherein the initial non-zero velocity of the control object is in a first direction away from the destination position, and wherein an initial portion of the profile displaces the control object along a sinusoidal path that displaces the control object farther from the destination position than the initial position while moving in the first direction and a subsequent portion of the profile returns the control object back to the destination position along a second sinusoidal path while moving in a second direction opposite the first direction.

14. The apparatus of claim 10, wherein the profile results in the control object having a substantially zero velocity at the destination position.

15. The apparatus of claim 10, wherein the formulating sequence comprises generating a sinusoidal feed forward command profile and generating a sinusoidal position reference profile, and the moving sequence comprises generating a control signal in relation to both the sinusoidal feed forward command profile and the sinusoidal position reference profile.

16. The apparatus of claim 10, wherein the formulating sequence comprises using a Taylor series approximation.

17. The apparatus of claim 10, wherein the moving sequence comprises applying current to a motor to cause the control object to nominally follow the profile over a plurality of samples during a seek interval.

18. The apparatus of claim 10, wherein the control object is characterized as a data transducer which is moved from an initial track to a destination track on an adjacent storage medium.

19. An apparatus comprising a control object, and first means for formulating a sine-based trajectory profile in relation to an initial non-zero velocity of the control object, and for moving the control object from an initial position to a destination position in relation to the profile and the initial non-zero velocity wherein the first means displaces the control object both toward and away from the destination position during said movement to the destination position.

20. The apparatus of claim 19, wherein the control object is characterized as a data transducer adjacent a storage medium, and the first means comprises a servo controller configured to position the data transducer adjacent tracks of the storage medium in accordance with said profile.

* * * * *